United States Patent [19]

Taylor

[11] 3,970,579

[45] July 20, 1976

[54] LOW MELTING LIQUID-CRYSTAL MIXTURES

[75] Inventor: Lynn J. Taylor, Haslett, Mich.

[73] Assignee: Owens-Illinois, Inc., Toledo, Ohio

[22] Filed: Aug. 2, 1971

[21] Appl. No.: 168,447

[52] U.S. Cl............................ 252/299; 23/230 LC; 350/160 LC; 428/1
[51] Int. Cl.$^2$........................ C09K 3/34; G02F 1/13
[58] Field of Search ............ 350/160; 252/408, 299; 260/566 R, 566 D, 566 F; 23/230 LC; 428/1

[56] References Cited

UNITED STATES PATENTS

| | | | |
|---|---|---|---|
| 2,544,659 | 3/1951 | Dreyer | 88/65 |
| 2,813,080 | 11/1957 | Bartlett | 252/403 |
| 2,951,832 | 9/1960 | Moran | 260/875 |

FOREIGN PATENTS OR APPLICATIONS

| | | | |
|---|---|---|---|
| 1,170,486 | 11/1969 | United Kingdom | 252/408 |

OTHER PUBLICATIONS

Russian Chemical Reviews, vol. 32, No. 9 – Sept. 1963, Chemical Characteristics, Structure, and Properties of Liquid Crystal – USOL'TSEUA et al., pp. 495–507.

*Primary Examiner*—William J. Van Balen
*Assistant Examiner*—Ellis P. Robinson
*Attorney, Agent, or Firm*—Donald Keith Wedding

[57] ABSTRACT

There is disclosed the in situ preparation of low melting liquid-crystal mixtures by simultaneously reacting two monofunctional reactants having the same functional group with at least one difunctional reactant having functional groups suitably reactive with the common reactive group of the first two monofunctional reactants so as to prepare a product having liquid-crystal properties and comprising a mixture of at least two, typically three or more components.

22 Claims, No Drawings

LOW MELTING LIQUID-CRYSTAL MIXTURES

THE INVENTION

This invention relates to the preparation of mesomorphic materials, typically of the nematic type. More particularly, this invention relates to a process for preparing mesomorphic materials which are highly suitable for use in an electronic display and/or memory device.

Mesomorphic materials, typically referred to as liquid-crystal materials, are organic compounds in a transition state between crystalline solid and normal isotropic liquid forms. Such materials are well known in the prior art. Likewise, it is known in the prior art to use liquid crystals in electronic display or memory devices.

Such devices typically comprise a thin layer of liquid crystals sandwiched between two sheets of glass. Normally, the thin layer of liquid crystal material is clear, but when an electric field is applied to it, some portions or regions of the material become turbulent so as to scatter light. By controlling the size and shape of the turbulent regions, images can be formed. Primarily, this effect is obtained by use of liquid-crystal materials of the nematic type.

In one particular embodiment, a liquid-crystal material is sandwiched as a dielectric in a parallel plate capacitor with one electrode transparent and the other electrode either transparent or reflecting. The liquid is kept between the electrodes by capillary action, since electrode spacings are of the order of ½ mil. An applied d.c. or low-frequency (less than 100 Hz.) field of more than 30,000 volts per centimeter changes the cell from transparent to turbulent in a few milliseconds. Depending upon the liquid crystal composition, the opaque effect may remain even after the field is removed. In other words, an optical signal may be maintained with no applied power. The cell can be turned clear again by applying a higher frequency (greater than 700 Hz.) signal. The sample remains clear after the signal is removed.

Additional embodiments of liquid-crystal electro-optical devices are disclosed and illustrated in U.S. Letters Patents 3,401,262 and 3,410,999; Proceedings of the IEEE, Vol. 56, No. 12, Dec., 1968, pages 2,146 to 2,149; The Glass Industry, August, 1968, pages 423 to 425; Chemical and Engineering News, Sept. 30, 1968, pages 32 and 33; Physics Today, July, 1970, pages 30 to 36; Electronics, July 6, 1970, pages 64 to 70; U.S. Letters Patent 3,322,485 to Williams.

In accordance with this invention, a low melting liquid-crystal mixture is prepared in situ by simultaneous or sequential synthesis of its components.

More particularly, a liquid-crystal mixture is prepared in situ by simultaneously reacting a mixture of at least two monofuntional reactants having the same functional group with at least one difunctional reactant having functional groups suitably reactive with the common reactive group of the first tow monofunctional reactants so as to prepare a product having liquid-crystal properties and comprising a mixture of at least two, typically three or more, components.

In one specific embodiment hereof, there is reacted a mixture of at least two aromatic monofunctional aldehydes with at least one diamine having two primary amino groups so as to prepare a product comprising a mixture of at least three Schiff bases.

One example comprises using para-phenylenediamine as the diamine;

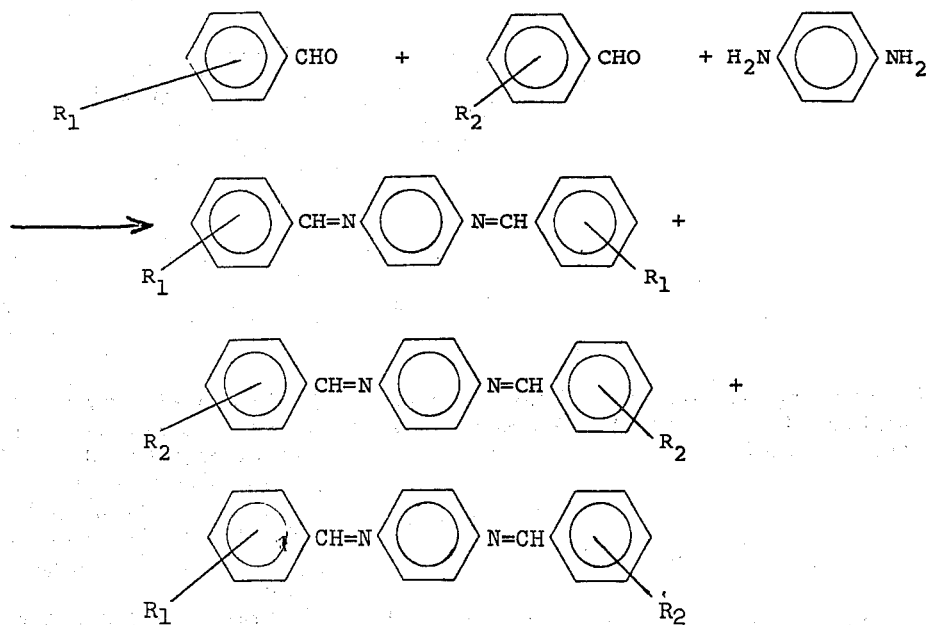

where $R_1$ and $R_2$ are different substituents (or the same substituent, differently positioned).

Such substituents are selected from the group consisting of hydrogen; alkyl radicals of one to sixteen carbons; alkoxyl radicals of one to sixteen carbons; halogens (F,Cl,Br,I); cyano (—CN); amide (—CONH$_2$); singly or doubly substituted amides (—CONHR or —CONR$_1$R$_2$) where the substituent is an alkyl of one to six carbons; dialkyl amino (—NR$_1$R$_2$) where the alkyl substituents are selected from the same or different lower alkyls of one to six carbon atoms; phenyl; substituted phenyl; hydroxyl (—OH); carboxyl (-COOH); acyl

where the alkyl substituent is selected from lower alkyls of one to six carbons; carbalkoxy (-COOR) where the alkyl substituent is selected from lower alkyls of one to six carbon atoms; acyloxy

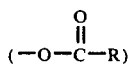

where the alkyl substituent is selected from lower alkyls of one to six carbon atoms; substituted or unsubstituted benzyloxy ($C_6H_5CH_2O$—); substituted or unsubstituted benzoyl

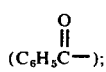

substituted or unsubstituted benzyl ($C_6H_5CH_2$—); substituted or unsubstituted phenylazo ($C_6H_5N=N$-); nitroso (-N=O); nitro; acylamino (—NHCOR) where R is an alkyl of one to six carbons; and sulfur containing radicals corresponding to the oxygen analogs hereinbefore.

The point of attachment or $R_1$ or $R_2$ may be ortho, meta, or para with respect to the reactive functional group. The para attachment is preferred in most instances.

In addition to or in lieu of the para-phenylenediamine, there may be used other suitably reactive diamines such as hydrazine; ethylenediamine; trimethylenediamine; hexamethylenediamine; 1,4-cyclohexanediamine (cis- and/or trans-); benzidine; p,p′ - diaminodiphenyl ether; p,p′ - diaminodiphenyl sulfide; p,p′ - diaminodiphenylmethane; p,p′ - diaminostilbene (preferably trans- ); 1,2 - bis-(p-aminophenyl)ethane; p,p′-diaminoazobenzene; p,p′-diaminoazoxybenzene; 1,4 - naphthalenediamine; p-xylylenediamine; and derivatives of the above including those bearing substituents attached to aromatic or aliphatic carbon atoms, such substituents being selected from the group already defined hereinbefore for $R_1$ and $R_2$ in the phenylenediamine embodiment.

In another specific embodiment hereof, there is reacted a mixture of at least two monofunctional amines with at least one dialdehyde so as to prepare a product comprising a mixture of at least three Schiff bases.

One example comprises using terephthalaldehyde as the dialdehyde:

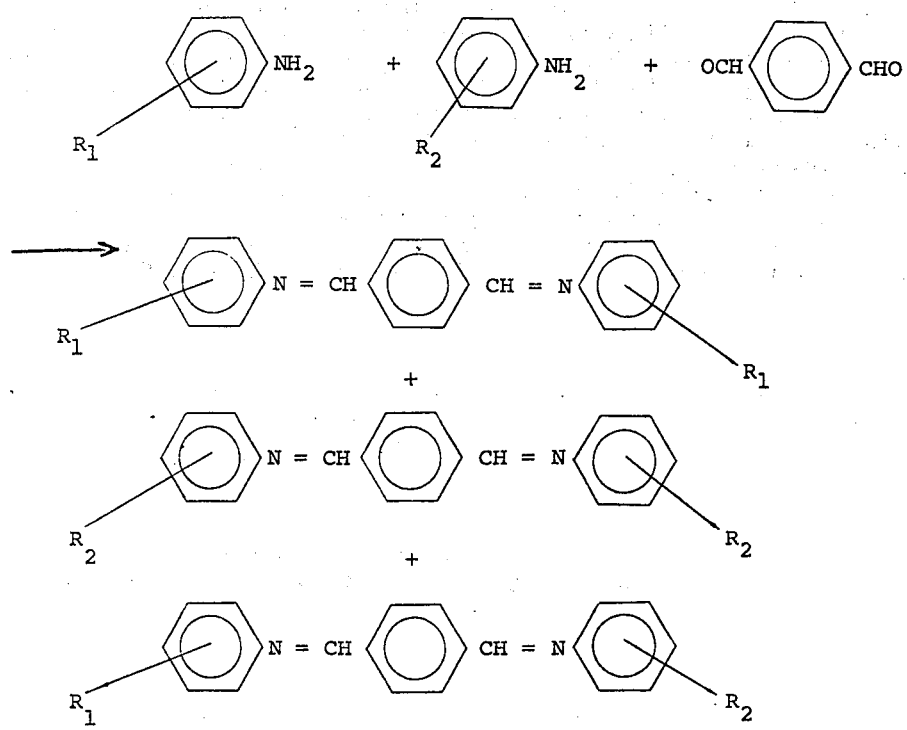

(or the same substituent, differently positioned) where $R_1$ and $R_2$ are different substituents/selected from the group already defined hereinbefore for $R_1$ and $R_2$ in the phenylenediamine embodiment.

The point of attachment of $R_1$ or $R_2$ may be ortho, meta, or para with respect to the reactive functional group. The para attachment is preferred in most instances.

In addition to or in lieu of the terephthalaldehyde, there may be used other suitably reactive dialdehydes, including biphenyl-4,4′ - dicarboxaldehyde; diphenylmethane -4,4′-dicarboxaldehyde; diphenyl ether -4,4′-dicarboxaldehyde; diphenyl sulfide -4,4′-dicarboxaldehyde; naphthalene -1,4 -dicarboxaldehyde; anthracene-9,10-dicarboxaldehyde; p-xylene$\alpha,\alpha'$-dicarboxaldehyde; glyoxal; malonaldehyde; succinaldehyde; glutaraldehyde; dialdehydes derived from pyridine, thiophene, and furan; and derivatives of the above including those bearing substituents attached to aromatic or aliphatic carbon atoms, such substituents being selected from the group already defined hereinbefore for R$_1$ and R$_2$ in the phenylenediamine embodiment.

It should also be understood that the dialdehyde may be replaced by an equivalent diketone, such as p-diacetylbenzene; p,p'-diacetylbiphenyl; p,p'-diacetyldiphenylmethane; p,p'-diacetyl diphenyl ether; 2,3 - butanedione; 2,4 - pentanedione; and 2,5 - hexanedione.

In a further specific embodiment, there is reacted a mixture of at least two substituted or unsubstituted monofunctional aromatic amines (or at least two phenols) with at least one substituted or unsubstituted difunctional diazonium salt such as p-phenylene bis(-diazonium fluoborate), so as to produce a product mixture of at least three bis-azo compounds, one of which may be unsubstituted.

In a further specific embodiment, there is reacted a mixture of at least two substituted or unsubstituted benzylidene triphenylphosphoranes with at least one substituted or unsubstituted dialdehyde so as to produce a product mixture comprising at least three distyrylbenzenes, one of which may be unsubstituted.

In a further specific embodiment, there is reacted at least one substituted or unsubstituted p-xylylene bis (triphenylphosphorane) with a mixture of at least two substituted or unsubstituted benzaldehydes so as to produce a product mixture comprising at least three distyrylbenzenes, one of which may be unsubstituted.

In a further specific embodiment, there is reacted a mixture of at least two substituted or unsubstituted benzoic acids (or benzoylhalides) with at least one substituted or unsubstituted diol, such as hydroquinone or ethylene glycol, so as to produce a product mixture comprising at least three diesters, one of which may be unsubstituted.

In a further specific embodiment, there is reacted at least one substituted or unsubstituted dicarboxylic acid such as terephthalic acid or succinic acid with a mixture of at least two substituted or unsubstituted phenols so as to produce a product mixture comprising at least three diesters, one of which may be unsubstituted.

In a further specific embodiment, there is reacted at least one substituted or unsubstituted diacyl halide, such as terephthaloyl chloride or succinyl chloride, with a mixture of at least two substituted or unsubstituted phenols, so as to produce a product mixture comprising at least three diesters, one of which may be unsubstituted.

In a further specific embodiment, phosgene is allowed to react with a mixture of at least two alcohols or phenols, so as to produce a product comprising a mixture of at least three dialkyl, diaryl, or alkyl aryl carbonates.

In the practice of this invention, the term mixture is intended to include sequential and/or simultaneous addition of the reagents. Thus it is contemplated that one monofunctional reagent may be added and reacted with the difunctional reagent(s) and then one or more additional monofunctional reagents added, either simultaneously as a mixture or sequentially one at a time.

The following EXAMPLE represents one of the best embodiments contemplated by the inventor in the practice of the invention.

EXAMPLE

A three-necked flask fitted with a distilling receiver (Barrett type) and reflux condenser was charged with 22.3 grams (g.) (0.095 mole) p-n-octyloxybenzaldehyde, 13.55 g. (0.095 mole) 2-chloro-p-phenylenediamine, 0.50 g. p-toluenesulfonic acid monohydrate, and 500 milliliters (ml.) of benzene. This mixture was refluxed for a 2-hr. period, during which by-product water (1.3 ml.) was removed by azeotropic distillation. p-chlorobenzaldehyde (13.35 g., 0.095 mole) was then added and the resulting mixture refluxed an additional 11 hrs.; an additional 1.4 ml. water was removed during this period. The reaction mixture was filtered. Evaporation of the filtrate yielded 47.0 g. of turbid liquid, which was observed to exhibit characteristic "clearing-point" behavior at 158°–165°C. when a sample was heated in a glass capillary tube.

When a sample of the reaction product was placed between two glass plates bearing conductive tin oxide coatings and subjected to a voltage difference of 200 volts, a characteristic "dynamic scattering" effect was observed visually.

The liquid crystals of this invention may be employed for a wide variety of uses including electro-optical devices as already described hereinbefore.

It is further contemplated that the liquid-crystals may be used as a temperature indicator. For example, a sheet or film (rigid or flexible) of a composite liquid-crystal material could be applied directly to the body of an animal, e.g. human skin.

Another use includes the detection of gases, e.g. air pollutants. Certain liquid crystals undergo changes in color, opacity, etc., in the presence of certain gases.

In one particular embodiment hereof, the liquid-crystals are used as a chromatographic stationary phase for the separation of gaseous phase materials. Such embodiment comprises positioning a liquid-crystal containing structure transversely in a gas stream to determine gas transport rates, e.g. solubility factors, etc., and also to separate gases in the stream. In the practice of such embodiment, nematic crystals in particular may exhibit unusual selectivity factors.

Other possible applications or uses include detectors of pressure, structural strain or stress, and ultraviolet radiation.

In addition, the liquid-crystal products of this invention may be utilized in combination with multiple gas discharge display/memory panels.

Multiple gas discharge display and/or memory panels of the type with which the present invention is concerned are characterized by an ionizable gaseous medium, usually a mixture of at least two gases at an appropriate gas pressure, in a thin gas chamber or space between a pair of opposed dielectric charge storage members which are backed by conductor (electrode) members, the conductor members backing each dielectric member typically being transversely oriented to define a plurality of discrete discharge volumes and constituting a discharge unit. In some prior art panels the discharge units are additionally defined by surrounding or confining physical structure such as by cells or apertures in perforated glass plates and the like so as to be physically isolated relative to other units. In either case, with or without the confining physical structure, charges (electrons, ions) produced upon ionization of the gas of a selected discharge unit, when proper alternating operating potentials are applied to selected conductors thereof, are collected upon the surfaces of the dielectric at specifically defined locations and constitute an electrical field opposing the electrical field which created them so as to terminate the discharge for the remainder of the half cycle and aid in the initiation of a discharge on a succeeding opposite half cycle of applied voltage, such charges as are stored constituting an electrical memory.

Thus, the dielectric layers prevent the passage of any conductive current from the conductor members to the gaseous medium and also serve as collecting surfaces for ionized gaseous medium charges (electrons, ions) during the alternate half cycles of the A.C. operating potentials, such charges collecting first on one elemental or discrete dielectric surface area and then on an opposing elemental or discrete dielectric surface area on alternate half cycles to constitute an electrical memory.

An example of a panel structure containing non-physically isolated or open discharge units is disclosed in U.S. Letters Patent 3,499,167 issued to Theodore C. Baker et al.

An example of a panel containing physically isolated units is disclosed in the article by D. L. Bitzer and H. G. Slottow entitled "The Plasma Display Panel — A Digitally Addressable Display With Inherent Memory," Proceeding of the Fall Joint Computer Conference, IEEE, San Francisco, California, Nov. 1966, pages 541-547. Also reference is made to U.S. Letters Patent 3,559,190.

In accordance with this invention, the liquid-crystals may be sandwiched as a layer adjacent to or internally of the discharge panel, or suitably incorporated into the dielectric. Other means of combination are also contemplated.

The utility of mixtures prepared in accordance with this invention is not necessarily limited to their liquid-crystal properties. Such materials may also be useful as plasticizers, stabilizing additives, photosensitizers, chemical intermediates, solvents, colorants, and as components of paints, inks, and coating vehicles.

It is contemplated that the process of this invention may also be utilized to prepare mixtures which do not have liquid-crystal properties, e.g. by selection of appropriate substituents. Likewise, many such mixtures may have useful properties at temperatures where they do not exist in the liquid-crystalline state.

The reactants of this invention may be used on the basis of stoichiometric or non-stoichiometric ratios.

As used herein, the term "stoichiometric ratio" is defined as that relative quantity of the reactants which would theoretically lead to the consumption, by chemical reaction, of all reacting functional groups.

I claim:

1. A process for preparing in situ a mixture of at least two liquid-crystal compounds which comprises the steps of
   a. forming a mixture of at least two monofunctional reactants having the same functional group and at least one difunctional reactant having functional groups suitably reactive with the common reactive group of the first two monofunctional reactants, and
   b. reacting said reactants in situ to form a product mixture having liquid-crystal properties and comprising a mixture of at least two components.

2. The process of claim 1 wherein said monofunctional reactants comprise at least two aromatic monofunctional aldehydes and said difunctional reactant comprises at least one diamine having two primary amino groups, said aldehyde and diamine being reacted to form a product mixture of at least three Schiff bases, one of said bases being an unsymmetrical bis-Schiff base.

3. The process of claim 2 wherein the diamine is a substituted or unsubstituted para-phenylenediamine.

4. The process of claim 1 wherein said monofunctional reactants comprise at least two monofunctional amines and said difunctional reactant comprises at least one dialdehyde, said amines and dialdehyde being reacted to form a product comprising a mixture of at least three Schiff bases.

5. The process of claim 4 wherein the dialdehyde is a substituted or unsubstituted terephthalaldehyde.

6. The process of claim 4 wherein the dialdehyde is replaced with an equivalent diketone.

7. The process of claim 1 wherein said monofunctional reactants comprise at least two substituted or unsubstituted benzylidene triphenylphosphoranes and said difunctional reactant comprises at least one substituted or unsubstituted dialdehyde, said benzylidene triphenylphosphoranes and dialdehyde being reacted to form a product mixture comprising at least three distyrylbenzenes.

8. The process of claim 1 wherein said difunctional reactant comprises at least one substituted or unsubstituted p-xylylene bis (triphenylphosphorane) and said monofunctional reactants comprise at least two substituted or unsubstituted benzaldehydes, said p-xylylene bis (triphenylphosphorane) and benzaldehydes being reacted to form a product mixture comprising at least three distyrylbenzenes.

9. The process of claim 1 wherein said monofunctional reactants comprise at least two substituted or unsubstituted benzoic acids or benzoyl halides and said difunctional reactant comprises at least one substituted or unsubstituted diol, said benzoic acids and diol being reacted to form a product mixture comprising at least three diesters.

10. The process of claim 1 wherein said difunctional reactant comprises at least one substituted or unsubstituted dicarboxylic acid and said monofunctional reactants comprise a mixture of at least two substituted or unsubstituted phenols, said dicarboxylic acid and phenols being reacted to form a product mixture comprising at least three diesters.

11. The process of claim 1 wherein said difunctional reactant comprises at least one substituted or unsubstituted diacyl halide and said monofunctional reactants comprise at least two substituted or unsubstituted phenols, said diacyl halide and said phenols being reacted to form a product mixture comprising at least three diesters.

12. The process of claim 1 wherein said difunctional reactant is phosgene and said monofunctional reactants are at least two alcohols or phenols, said phosgene and alcohols or phenols being reacted to form a product comprising a mixture of at least three dialkyl, diaryl, or alkyl aryl carbonates.

13. The process of claim 2 wherein the reaction is in accordance with the following formula:

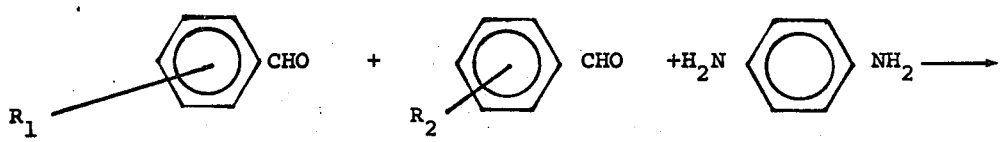

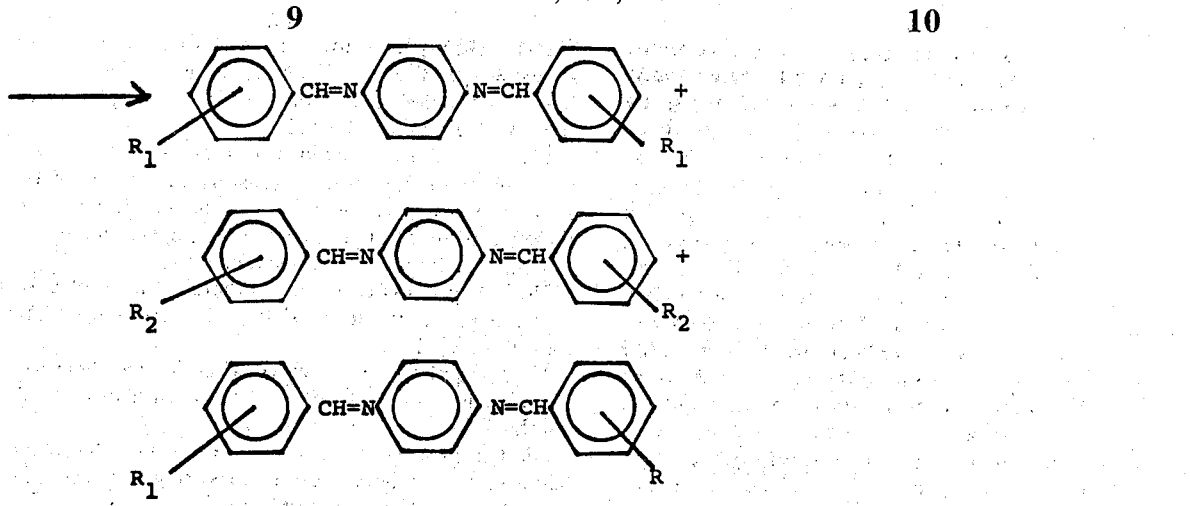

where $R_1$ and $R_2$ are different substituents or the same substituent differently positioned, said substituents being selected from the group consisting of hydrogen, alkyl radicals of one to sixteen carbon atoms, alkoxyl radicals of one to sixteen carbon atoms, halogens, cyano radicals, amide radicals, singly substituted amide radicals where the substituent is an alkyl of one to six carbon atoms, doubly substituted amide radicals where each substituent is an alkyl of one to six carbon atoms, dialkyl amino radicals wherein the alkyl substituents are lower alkyls of one to six carbon atoms, phenyl radical, substituted phenyl radicals, hydroxyl radical, carboxyl radical, acyl radicals wherein the alkyl substituent contains one to six carbon atoms, carbalkoxy radicals wherein the alkyl substituent contains one to six carbon atoms, acyloxy radicals wherein the alkyl substituent contains one to six carbon atoms, benzyloxy radical, substituted benzyloxy radicals, benzoyl radical, substituted benzoyl radicals, benzyl radical, substituted benzyl radicals, phenylazo radical, substituted phenylazo radicals, nitroso radical, nitro radical, acylamino radicals wherein the alkyl substituent contains one to six carbon atoms, and sulfur containing radicals corresponding to the oxygen analogs hereinbefore.

14. The process of claim 13 wherein the diamine is selected from the group consisting of hydrazine; ethylenediamine; trimethylenediamine; hexamethylenediamine; 1,4-cyclohexanediamine; benzidine; p,p'-diaminodiphenyl ether; p,p'-diaminodiphenyl sulfide; p,p'-diaminodiphenylmethane; p,p'-diaminostilbene; 1,2-bis-(p-aminophenyl)ethane; p,p'-diaminoazobenzene; p,p'-diaminoazoxybenzene; 1,4-naphthalenediamine; p-xylylenediamine, and derivatives thereof.

15. The process of claim 4 wherein the reaction is in accordance with the following equation:

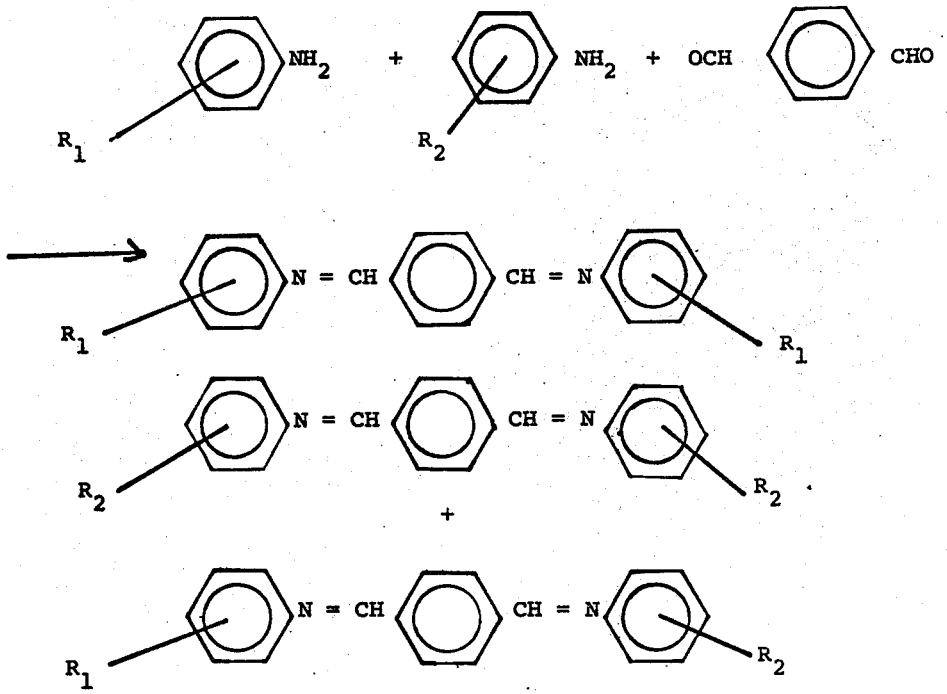

where $R_1$ and $R_2$ are different substituents or the same substituent differently positioned, said substituents being selected from the group consisting of hydrogen, alkyl radicals of one to sixteen carbon atoms, alkoxyl radicals of one to sixteen carbon atoms, halogens, cyano radicals, amide radicals, singly substituted amide radicals where the substituent is an alkyl of one to six carbon atoms, doubly substituted amide radicals where each substituent is an alkyl of one to six carbon atoms, dialkyl amino radicals wherein the alkyl substituents are lower alkyls of one to six carbon atoms, phenyl radical, substituted phenyl radicals, hydroxyl radical, carboxyl radical, acyl radicals wherein the alkyl substituent contains one to six carbon atoms, carbalkoxy radicals wherein the alkyl substituent contains one to six carbon atoms, acyloxy radicals wherein the alkyl substituent contains one to six carbon atoms, benzyloxy radical, substituted benzyloxy radicals, benzoyl radical, substituted benzoyl radicals, benzyl radical, substituted benzyl radicals, phenylazo radical, substituted phenylazo radicals, nitroso radical, nitro radical, acylamino radicals wherein the alkyl substituent contains one to six carbon atoms, and sulfur containing radicals corresponding to the oxygen analogs hereinbefore.

16. The process of claim 15 wherein the dialdehyde is selected from the group consisting of biphenyl-4,4'-dicarboxaldehyde; diphenylmethane-4,4'-dicarboxaldehyde; diphenyl ether -4,4-dicarboxaldehyde; diphenyl sulfide-4,4'-dicarboxaldehyde; napthalene-1,4-dicarboxaldehyde; anthracene-9,10-dicarboxaldehyde; p-xylene-$\alpha\alpha'$-dicarboxaldehyde; glyoxal; malonaldehyde; succinaldehyde; glutaraldehyde; thiophene; furan; and derivatives thereof.

17. The process of claim 6 wherein said diketone is selected from the group consisting of p-diacetylbenzene; p,p'-diacetylbiphenyl; p,p'-diacetyldiphenylmethane; p,p'-diacetyl diphenyl ether; 2,3-butanedione; 2,4-pentanedione; and 2,5-hexanedione.

18. The process of claim 9 wherein said diol is selected from the group consisting of hydroquinone and ethylene glycol.

19. The process of claim 10 wherein said dicarboxylic acid is selected from the group consisting of terephthalic acid and succinic acid.

20. The process of claim 11 wherein said diacyl halide is selected from the group consisting of terephthaloyl chloride and succinyl chloride.

21. The process of claim 2 wherein said reactants are reflexed for a sufficient time to produce said product mixture.

22. The process of claim 4 wherein said reactants are reflexed for a sufficient time to produce said product mixture.

* * * * *